(12) United States Patent
Yoon et al.

(10) Patent No.: US 7,924,776 B2
(45) Date of Patent: Apr. 12, 2011

(54) AUXILIARY ACK CHANNEL FEEDBACK FOR CONTROL CHANNELS AND BROADCAST MULTICAST SIGNALS

(75) Inventors: Young C. Yoon, San Diego, CA (US); Li-Hsiang Sun, San Diego, CA (US); Sang G. Kim, San Diego, CA (US); Suk Woo Lee, San Diego, CA (US)

(73) Assignee: LG Electronics Inc., Seoul (KR)

( * ) Notice: Subject to any disclaimer, the term of this patent is extended or adjusted under 35 U.S.C. 154(b) by 782 days.

(21) Appl. No.: 11/925,554

(22) Filed: Oct. 26, 2007

(65) Prior Publication Data
US 2008/0259855 A1 Oct. 23, 2008

Related U.S. Application Data

(60) Provisional application No. 60/863,337, filed on Oct. 27, 2006, provisional application No. 60/863,557, filed on Oct. 30, 2006, provisional application No. 60/864,142, filed on Nov. 2, 2006, provisional application No. 60/868,060, filed on Nov. 30, 2006, provisional application No. 60/868,921, filed on Dec. 6, 2006, provisional application No. 60/884,012, filed on Jan. 8, 2007, provisional application No. 60/884,400, filed on Jan. 10, 2007.

(51) Int. Cl.
*H04W 4/00* (2009.01)
*G08C 25/02* (2006.01)

(52) U.S. Cl. ........................................ 370/328; 714/748
(58) Field of Classification Search .................. None
See application file for complete search history.

(56) References Cited

U.S. PATENT DOCUMENTS

| 2006/0133273 | A1 | 6/2006 | Julian et al. | |
| 2008/0046793 | A1* | 2/2008 | Heo et al. | 714/748 |
| 2008/0151829 | A1* | 6/2008 | Khandekar et al. | 370/329 |
| 2008/0168321 | A1* | 7/2008 | Lim et al. | 714/748 |
| 2009/0016265 | A1* | 1/2009 | Katayama et al. | 370/328 |
| 2009/0098899 | A1* | 4/2009 | Gorokhov et al. | 455/522 |

FOREIGN PATENT DOCUMENTS

| WO | 2004079947 | 9/2004 |
| WO | 2004114549 | 12/2004 |

\* cited by examiner

*Primary Examiner* — Ricky Ngo
*Assistant Examiner* — Clemence Han
(74) *Attorney, Agent, or Firm* — Lee, Hong, Degerman, Kang & Waimey

(57) ABSTRACT

A method for providing an assignment acknowledgement is provided. The method comprises: decoding forward link control channel data blocks according to parameters provided by an overhead channel message; receiving forward link packet data at an access terminal (AT) via a data channel; identifying an offset which defines that a certain number of subpackets of the packet data have been transmitted before the assignment acknowledgement is to be transmitted; and transmitting the assignment acknowledgement according to the offset to indicate successful decoding of one of the control channel data blocks only if the packet data has not been acknowledged.

9 Claims, 15 Drawing Sheets

| Field | bits |
|---|---|
| SCCHAckCHActivated | 1 |

0 or 8 occurrences of the following record

| SCCHACKCHIncluded | 1 |
|---|---|
| SCCHACKCHNode | 0 or 5 |

Fig. 12

AUXILIARY ACK CHANNEL FEEDBACK FOR CONTROL CHANNELS AND BROADCAST MULTICAST SIGNALS

CROSS-REFERENCE TO RELATED APPLICATIONS

Pursuant to 35 U.S.C. §119(e), this application claims benefit of priority from provisional patent applications Ser. Nos. 60/863,337, filed Oct. 27, 2006, 60/863,557, filed Oct. 30, 2006, 60/864,142, filed Nov. 2, 2006, 60/868,060, filed Nov. 30, 2006, 60,868,921, filed Dec. 6, 2006, 60/884,012, filed Jan. 8, 2007, and 60/884,400, filed Jan. 10, 2007, the contents of which are hereby incorporated by reference herein in their entirely.

FIELD OF THE INVENTION

The present invention relates to wireless communications, and in particular, to providing assignment acknowledgement for an access terminal.

DISCUSSION OF THE RELATED ART

Ultra Mobile Broadband (UMB) combines the best aspects of CDMA, TDM, LS-OFDM, OFDM, and OFDMA into a single air interface using sophisticated control and signaling mechanisms and advanced antenna techniques in order to deliver ultra-high fixed and mobile broadband performance.

UMB supports a forward link up to 280 Mbps and a reverse link up to 68 Mbps while mobile and an average network latency of 16.8 msec. Furthermore, voice over IP (VoIP) of up to 500 simultaneous users is facilitated while mobile. Moreover, UMB will enable the convergence of IP-based voice, broadband data, multimedia, information technology, entertainment and consumer electronic services.

UMB can efficiently support OFDMA MAC/Physical and fully support centralized as well as distributed access networks. Inter-access network interfaces are streamlined and fast layer 2 handoff is supported with seamless handoff across air interface revision boundaries.

FIG. 1 illustrates a UMB centralized access network support. As illustrated in FIG. 1, each access terminal (AT) maintains a separate protocol stack for each access network (AN) in the active set, with each protocol stack called a "route." Furthermore each base station controller (BSC) is a separate AN.

FIG. 2 illustrates a UMB distributed access network. As illustrated in FIG. 2, each AT in this network arrangement maintains a separate protocol stack for each AN in the active set and each cell is a separate AN.

UMB simplifies the inter-AN interface by requiring each AT to support multiple routes. A simpler inter-eBS interface leads to standardized, inter-operable implementations.

Each eBS in the active set uses a separate data route and there is no need to transfer RLP and header compression states between eBSs. Traffic flowing between an eBS and an AT can be tunneled through the serving eBS, thereby supporting fast and seamless re-pointing between cells.

Signaling messages of protocols between an eBS and an AT can be tunneled through the serving eBS. No eBS has to maintain a connection state of other eBSs in the active set.

UMB layering also reduces the number of protocols in the data path. FIG. 3 illustrates UMB layers in which the application layer provides a signaling application, IP, RoHC, EAP and inter-technology tunneling. The radio link layer provides RLP and associated protocols. The MAC layer provides a packet consolidation protocol and control of physical layer channels. The physical layer defines characteristics of air interface channels. The security functions are protocols for ciphering, message integrity, and key exchange. The route control plane controls the creation and maintenance of air interface protocol stacks, one for each eBS. The session control plane provides session negotiation. The connection control plane controls the connection between the AT and an eBS.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In accordance with an embodiment, a method for providing an assignment acknowledgement includes receiving a forward link overhead channel message at an access terminal (AT), the overhead channel message including a parameter used to indicate which shared control channel (SCCH) message data blocks are to be acknowledged by the AT. The method further includes receiving a forward link SCCH signal having SCCH data blocks, decoding the SCCH data blocks according to parameters provided by the overhead channel message, detecting a change in access terminal assignment for the AT based upon the SCCH signal, and receiving forward link packet data at the AT via a data channel. The method further includes identifying an offset which defines that a certain number of subpackets of the packet data have been transmitted before an assignment acknowledgement is to be transmitted, and transmitting the assignment acknowledgement according to the offset to indicate successful decoding of one of the SCCH data blocks only if the packet data has not been acknowledged by the AT.

According to a feature, the access terminal assignment includes encoding format data, modulation format data, resource allocation data, reverse link power adjustment data, persistent assignment indication, residue assignment indication, and supplemental assignment indication.

According to another feature, the overhead channel message further includes identification of resources used to transmit the SCCH signal, encoding format data, modulation format data, number of SCCH and data blocks which are included in the SCCH signal.

According to yet another feature, the method further includes utilizing a same resource but different signal waveform to transmit either an acknowledgement of successful decoding of the packet data or the assignment acknowledgement.

In accordance with an alternative embodiment, a method for providing an assignment acknowledgement includes receiving a forward link overhead channel message at an access terminal (AT), the overhead channel message having a parameter used to indicate which shared control channel (SCCH) message data blocks are to be acknowledged by the AT, and receiving a forward link SCCH signal includes SCCH data blocks. The method further includes decoding the SCCH data blocks according to parameters provided by the overhead channel message, detecting a change in access terminal assignment for the AT based upon the SCCH signal, and transmitting reverse link packet data from the AT via a data channel. Additional operations include identifying an offset which defines that a certain number of subpackets of the packet data have been transmitted before an assignment acknowledgement is to be transmitted, and transmitting the assignment acknowledgement according to the offset to indicate successful decoding of one of the SCCH data blocks only if the packet data has not been acknowledged by the AN.

These and other embodiments will also become readily apparent to those skilled in the art from the following detailed description of the embodiments having reference to the attached figures, the invention not being limited to any particular embodiment disclosed.

BRIEF DESCRIPTION OF THE DRAWINGS

The above and other aspects, features, and advantages of the present invention will become more apparent upon consideration of the following description of preferred embodiments, taken in conjunction with the accompanying drawing figures.

FIG. 4 depicts the situation in which the AN sends the F-SCCH and F-DCH subpackets to the AT.

FIG. 12 depicts fields in an message such as an ExtendedChannelInfo message.

DETAILED DESCRIPTION OF THE PREFERRED EMBODIMENTS

Figure 1:
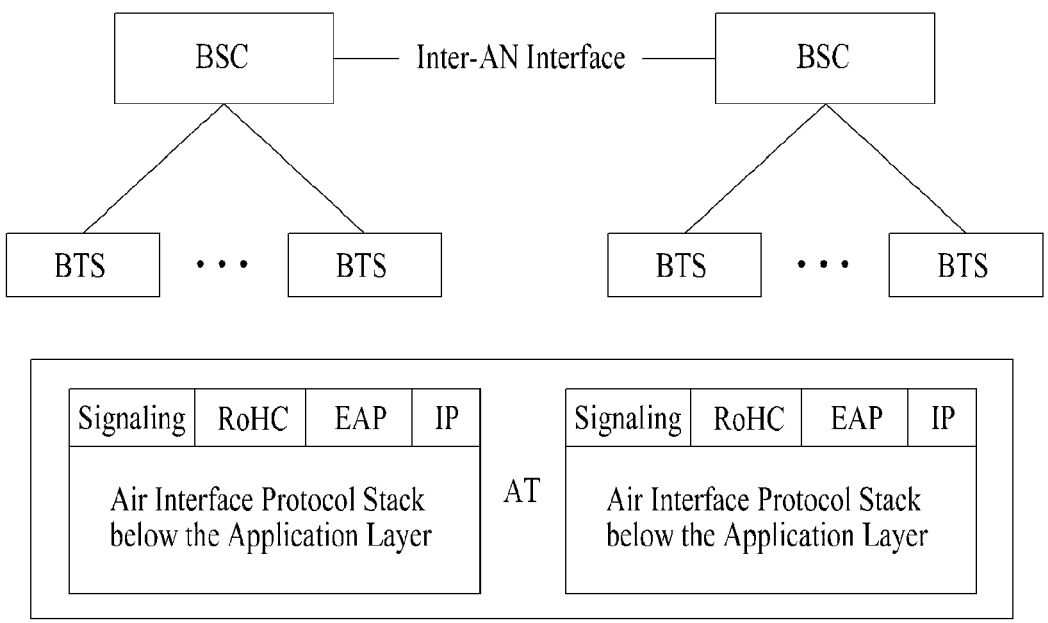
FIG. 1 illustrates a UMB centralized access network.
Figure 2:
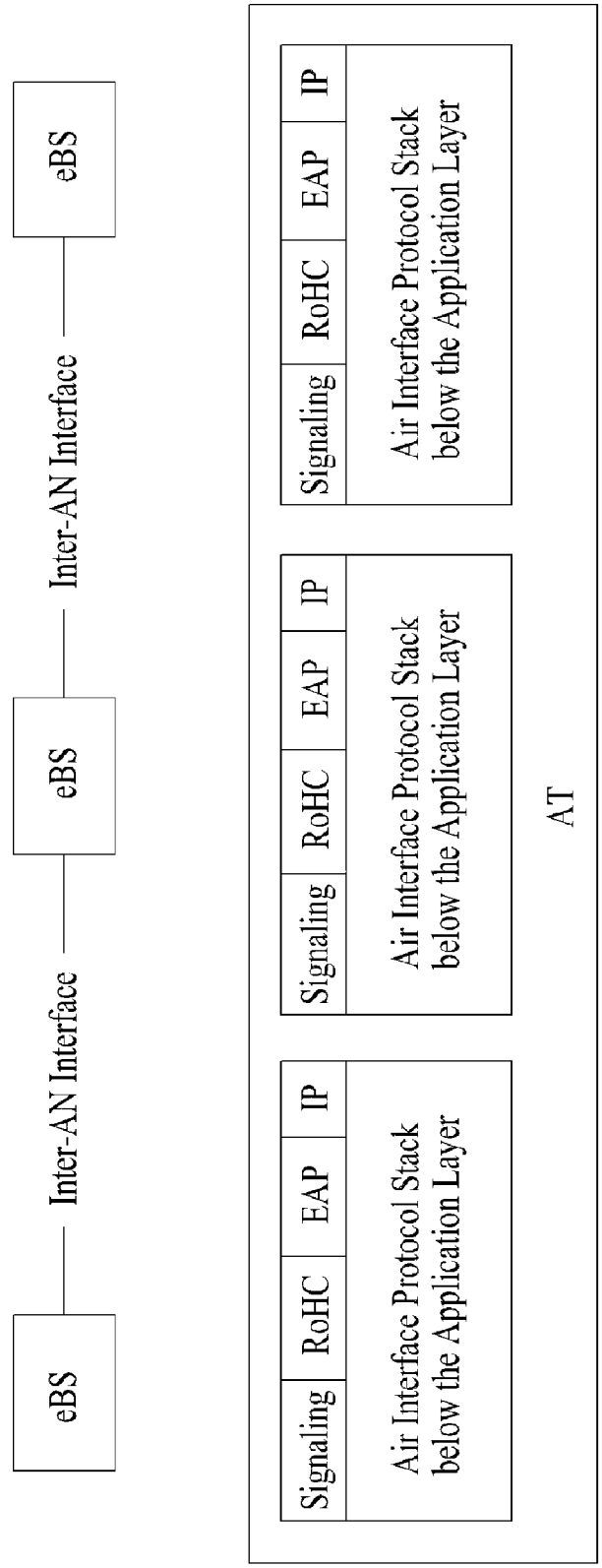
FIG. 2 illustrates a UMB distributed access network.
Figure 3:
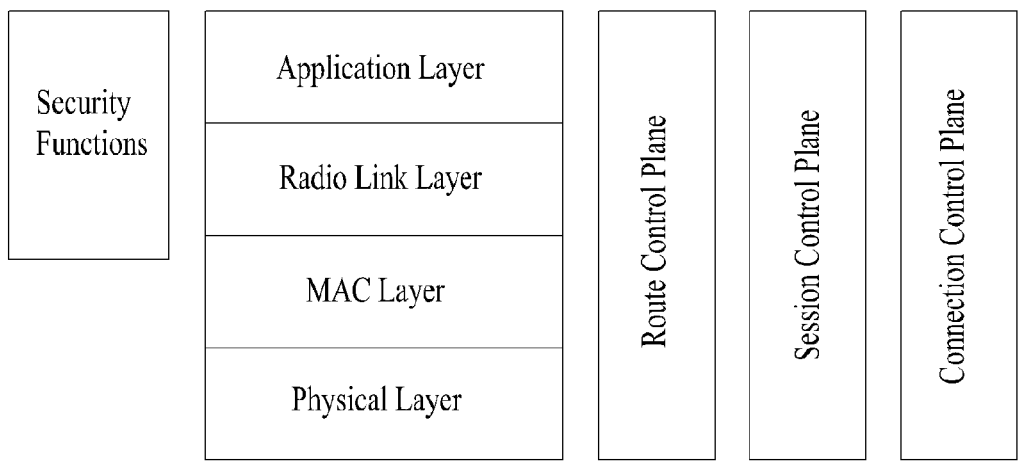
FIG. 3 illustrates UMB layers in which the application layer provides a signaling application, IP, RoHC, EAP and inter-technology tunneling.

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Various wireless communication systems, such as high-speed downlink packet access (HSDPA), 1xEV-DO, 1xEV-DV, and 3GPP2 UMB, have incorporated physical layer automatic repeat-request (ARQ) or hybrid-ARQ (H-ARQ) for retransmissions of an encoded sub-packets. A sub-packet is typically generated by passing an information packet to a channel coder (e.g., a turbo encoder or a convolution encoder). A typical channel coder generates multiple sub-packets which contain systematic (original information) bit and/or parity bits (new, redundancy). When each subpacket is identical, the ARQ design is referred to as chase combining. On the other hand, when each subpacket is different, the ARQ design is referred to as incremental redundancy (IR).

When a subpacket is received by a receiver (Rx) via the packet data channel (PDCH), for example, the Rx can return a negative acknowledgement (NAK) if the subpacket cannot be decoded. The PDCH will also be referred to as a data channel (DCH) or forward traffic channel (FTC). Transmitter (Tx) then retransmits the NAKed subpacket unless the maximum number of subpacket retransmissions has been exceeded.

On the other hand, the Rx can return a positive acknowledgement (ACK) if the subpacket is successfully decoded by the Rx. The ACK or NAK feedback is typically returned via a feedback acknowledgement channel (ACKCH).

Such systems can also transmit a packet data control channel (PDCCH), which are also referred as a control channel (CCH), shared control channel (SCCH), or shared signaling control channel (SSCH). The PDCCH is used to support the transmission of the PDCH. The PDCCH may carry control information needed by the Rx to decode the PDCH. The control information includes information such as PDCH transmission format (modulation and coding rate), channel time-frequency resources (or channelization resources), receiver identification information (often referred to as medium access control (MAC ID)), and various other types of control information. Problems of the existing system and generalized solutions and enhancements will now be addressed.

Control Channel Management

As noted above, ACKCH may be implemented to support physical layer ARQ of the PDCH. One issue that is raised relates to techniques for acknowledging the control channels. Such information is needed to power control the control channels to ensure a certain target frame error rate (FER). This is sometimes referred to as outer-loop power control. For example, it may be desirable to ensure that a control channel operates at particular FER (e.g., FER of 1% or 0.1%). Without feedback on the control channel information, such FER control may not be possible. Further, such information ensures that Tx power is efficiently allocated to the control channel. Otherwise, without such feedback, the Tx may over-provision and transmit at a much higher power than necessary.

Dedicated Control Channel Management: PDCH Acknowledgements

Problems for systems with on-off keying (OOK) based ACKCH for PDCH acknowledgements will now be described. Systems which implement OOK in the design of the ACKCH typically use OFF to represent a NAK and ON to represent an ACK. The OOK often permits Tx power savings. The use of OFF (no Tx energy) allows for Tx power savings when the OFF signal has a higher likelihood occurrence. For example, the first subpacket has a greater probability of incurring a NAK.

The use of OOK for ACKCH design introduces various problems which do not typically occur with non-OOK type signaling such as binary phase shift keying (BPSK).

Typical non-OOK signaling involves signal energy transmitted for both ACK and NAK transmission. Consequently, after a Tx transmits a PDCCH, if the Tx does not detect the ACKCH for this non-OOK case, then the Tx determines that the PDCCH had been missed by the Rx. On the other hand, if the Tx detects the ACKCH ACK or NAK, then the Tx determines that the PDCCH had been received by the Rx.

With OOK signaling, a possible ambiguity may occur. For instance, after a Tx transmits a PDCCH, if the Tx does not detect a signal from the ACKCH (meaning an OFF which represents a NAK), such an occurrence defines one of two states to the Tx: either the Rx missed the PDCCH or the Rx received the PDCCH but could not decode the PDCH. As a result, a current Tx is unable to distinguish between these two states.

One technique for resolving this ambiguity using OOK signaling-based ACKCH for PDCH ARQ operation includes use of an auxiliary feedback acknowledgement channel (auxACKCH) to feedback ACK or NAKs for PDCCH reception back to the Tx.

Dedicated Control Channel Management: R-PDCH Acknowledgement

Consider now a cellular system operating with a reverse link packet data channel (R-PDCH), which will also be referred to as a reverse link data channel (R-DCH). Such a system may further include a forward link PDCCH (F-PDCCH) to schedule a terminal to transmit an R-PDCH. In some cases, the sector (or base station) may fail to decode the R-PDCH. Consequently, it may be difficult for the sector to distinguish between the following two states: whether the AT missed the F-PDCCH or whether the sector is unable to decode the transmitted the R-PDCH packet. It is helpful for the system to be able to determine which of these scenarios are present.

Shared Acknowledgements of Broadcast/Multicast Type Control Channels

Several possibilities will be addressed in which shared acknowledgements of broadcast/multicast type control channels are provided. Examples of this type of control channel include the 3GPP2 UMB broadcast/multicast bitmap for group resource allocation (GRA), and a packet data control channel (PDCACH) for PDCCH assignment. According to various embodiments, monitoring and managing of performance of broadcast/multicast control channels are possible.

Shared Acknowledgements of BCMCS Signals

Broadcast multicast services (BCMCS), as well as broadcast multicast-type services such as digital video broadcasting (DVB), MediaFLO, MBMS, and the like, may be facilitated by channel quality feedback. Improvements may include efficiently transmitting feedback (e.g., in terms of channel and power resources). Various embodiments described herein may be implemented in assorted wireless communication systems such as the 3GPP LTE, 3GPP UMTS (HSPA and HSPA+), 3GPP2 UMB, Mobile WiMAX, and the like.

Embodiments related to a reverse link scchACKCH (auxACKCH) will now be described. In general, the scchACKCH is a reverse link ACK channel used to acknowledge an ACK or NAK to a forward link Shared Control Channel (SCCH), Link Assignment Message (LAM), Link Assignment Block (LAB), or access grant sent on the forward link. The term SCCH will be used to represent the channel or resources to send a LAM, LAB, or access grant. In general, this auxACKCH may be used to acknowledge detection (or misses) of various channels other than the PDCH. These channels include control channels (dedicated, broadcast or multicast) and BCMCS-type signals. One feature of the auxACKCH includes minimizing signaling overhead to minimize impact on channel capacity and interference generated.

In an embodiment the auxACKCH may be implemented to provide ACK or NAK acknowledgements from the receiver to the transmitter. If desired, ON-OFF Keying (OOK) may be used to transmit the auxACKCH such that the OFF represents NAK and ON represents ACK.

For example, consider a system which implements a reverse link auxACKCH (R-auxACKCH) and supports a forward link PDCH (F-PDCH) which has a corresponding reverse link ACKCH (R-ACKCH) using OOK to acknowledge the forward link (F-PDCH). According to this aspect, the R-ACKCH OFF represents a F-PDCH NAK and the R-ACKCH ON represents the F-PDCH ACK. If the terminal successfully detects the forward link PDCCH (F-PDCCH), the terminal may wait to see if it can decode the F-PDCH sub-packets. If the terminal fails to decode the F-PDCH after the final sub-packet is received (or by the time after the final sub-packet should have been received), the Rx sends an F-PDCCH ACK (ON) over the R-auxACKCH. On the other hand, if the AT misses the F-PDCCH, the AT cannot ACK the F-PDCCH and does not send anything over the R-auxACKCH—which is a NAK (OFF).

As an example, consider use of a reverse link auxACKCH (R-auxACKCH) in a communication system which supports the reverse link PDCH (R-PDCH). If the terminal successfully detects the forward link PDCCH (F-PDCCH) which schedules a terminal to transmit, the terminal transmits sub-packets over the R-PDCH. Note that in this example it is understood that the F-PDCCH may be used to schedule the terminal to transmit and indicate which transmission format to use, which reverse link channel resources to use, and other information needed by the AT to transmit the R-PDCH.

If the sector receiver successfully decodes the R-PDCH, the sector realizes that the terminal successfully decoded the F-PDCCH. However, if the sector receiver fails to decode the R-PDCH, the sector receiver cannot distinguish between whether it missed the R-PDCH or if the terminal missed the F-PDCCH.

To resolve this issue, the terminal may be configured to transmit an R-auxACKCH ACK if the terminal does not receive an ACK on the forward link F-ACKCH indicating whether the sector receiver successfully received the R-PDCH encoder packet.

In terms of timing, the terminal may transmit the R-auxACKCH after the terminal transmits the final R-PDCH sub-packet and after the time it would have received an ACK (ON) on the F-ACKCH. This typically occurs after the maximum number of R-PDCH subpackets have been sent. One example involves sending the R-auxACKCH when the R-PDCH sends the next first subpacket of the next encoder packet for the same H-ARQ interlace.

Another approach includes an implicit approach which does not require the R-auxACKCH. In this approach, the sector Rx can measure the signal energy on the R-DCH and can make a hypothesis that a R-DCH signal is present even though the sector Rx cannot decode it. If the signal energy is greater than (or equal) to a certain threshold, the sector Rx may decide that the AT successfully decoded the F-SCCH. If the signal energy is less than (or equal) than a certain threshold, the sector Rx decides that the AT missed the F-SCCH. The detection reliability can be increased by measuring the signal energy for not only the first subpacket but multiple subpackets of the R-DCH packet. Further, if the AT decodes a R-DCH packet, this immediately implies, for example, that the AT successfully decoded the F-SCCH.

Another approach is to combine use of the R-auxACKCH with the implicit approach. In this approach, the ACKCH may be used to send the auxACKCH acknowledgements. That is, additional states may be added to the ACKCH to transmit the auxACKCH ACK/NAKs through the ACKCH.

For example, consider a typical design for F-PDCH operation as currently implemented in the 3GPP2 UMB. This example states that a R-ACKCH may use a pair of length-16 DFT codes for signaling. The signal energy is sent on one of the codes (e.g., code A) when an ACK is sent and no signal energy is sent on either of the codes (OFF such that both codes A and B are left OFF).

This R-ACKCH design may be modified to increase the number of signaling states from two states to three states. Examples of these three states are as follows:

OFF
    No signal energy on either Code A or Code B
    (Code a Off, Code B Off)
    F-PDCH and F-PDCCH are NOT detected
ON_Type 1
    (Code A on, Code B Off)
    F-PDCH ACK and by implication F-PDCCH ACK
ON_Type 2
    (Code A Off, Code B on)
    F-PDCH NAK and F-PDCCH ACK.

An embodiment relates to the creation of an additional physical layer channel. If desired, OOK may be used for signaling the R-auxACKCH. For example, consider the typical operation of the F-PDCH such as that described in 3GPP2 UMB. A CDMA reverse control channel (R-CCH) uses 1024-ary orthogonal signaling for transmitting up to 10 bits of control information for each of the different types of control channels described therein.

One orthogonal code of length 1024 could be used to OOK signal the R-auxACKCH. Signal energy is sent over the code for ACK (ON) and no signal energy is sent over the code for NAK (OFF).

For broadcast or multicast (BM) control of data channels transmitted to multiple terminals on the forward link, each terminal listening to such a broadcast or multicast channel can transmit the auxACKCH on the same time-frequency resource and/or signal space. For example, in OFDM, the auxACKCH of each AT could share the transmission time instants and frequency tones.

In the UMB case, this would typically include each terminal transmitting over the same sub-tiles. For example, in CDMA, the auxACKCH of each AT may share the same transmission time and signal waveform (i.e., the same channelization code and/or scrambling codes). This would typically result in each terminal transmitting with the same channelization code (same length-1024 code and the same scrambling code) such that a transmitted waveform for the auxACKCH from each AT would be identical. As a result, since the resources are shared, minimal resources are used to achieve savings for the overhead. Accordingly, when the sector receives no signal energy on the auxACKCH (OFF), then the sector receiver assumes that all the terminals have received the broadcast or multicast signal.

If there is signal energy on the auxACKCH (ON), the sector Rx determines that at least one terminal missed the BM signal. This allows the sector to realize that the packets of certain BM signals are not reaching certain terminals. With this feedback, the sector Tx can then do FER-based power control of the BM signal.

Alternatively, each terminal could instead send a terminal-specific R-auxACKCH if it fails to decode the BM signal. This signal may be transmitted using signaling similar to the R-ACKCH or a CDMA.

R-CCH.R-auxACKCH can also be called R-scchACKCH when it is used to acknowledge successful reception by a terminal of an F-SCCH (F-PDCCH). In a similar design approach to the R-ACKCH, the R-scchACKCH channel resources (sub-tiles) may be tied to a F-SCCH so that signaling resource may be shared. For example, if there are three F-SCCHs defined for a particular interlace, then three R-scchACKCHs may be implemented; one R-scchACKCH per F-SSCH (e.g., R-scchACKCH_0 for F-SCCH _0, R-scchACKCH_1 for F-SCCH_1, etc.). If desired, OOK signaling may also be used.

The R-scchACKCH may use the same or similar design as the R-ACKCH. To control and reduce reverse link signaling overhead, the R-scchACKCH may be disabled when the amount of channel (time-frequency) resources (e.g., number of leaf nodes or tiles) is less than (or equal to) some configured amount (e.g., 8 nodes). In addition, the R-scchACKCH may be enabled when the amount of channel resources is greater than (or equal to) some configurable amount. According to one alternative, instead of channel resources, the measure of channel resources could be replaced by the payload size, the data rate, and/or some combination of the three.

Various techniques for handling reception errors of the R-scchACKCH will now be described. If a R-scchACKCH ACK is received as a NAK, then the AN may terminate the packet transmission but could also retransmit to the same AT with the same format, for example. If the same F-SCCH and F-DCH are sent, then the AT could soft-combine the earlier sub-packet with the new subpacket.

Another technique is to require the AN scheduler to retransmit the same packet and the same SCCH to an AT when a R-scchACKCH NAK is received. If desired, this may be implemented only when the same AT is rescheduled. Thus, if a different AT is scheduled, then the earlier AT knows that the transmission to the earlier AT has been terminated. If a R-scchACKCH NAK is received as an ACK, then the AN would proceed as usual (i.e., as if the R-scchACKCH never existed).

Various aspects of a physical layer of a typical F-SCCH will now be described. The F-SCCH may be designed in a manner which is similar to the F-DCH to allow for physical layer ARQ of the F-SCCH and to generally permit forward link control channels. The F-SCCH may be retransmitted using chase combining or incremental redundancy. By chase combining, the same physical layer waveform of the F-SCCH in the first subpacket is retransmitted for the second subpacket of F-SCCH.

The retransmission number on the F-SCCH can be indicated in the F-SCCH. For example, a one-bit flag in the F-SCCH may indicate if the F-SCCH message is the first transmission or the second transmission (i.e., the retransmission). When an AT decodes the F-SCCH, and the F-SCCH is a second transmission, then the AT can soft-combine the F-DCH transmitted in the previous frame in the same interlace.

The AN may be configured to transmit the same first subpacket in conjunction with the first F-SCCH transmission and also along with the second F-SCCH. A benefit of this technique is increased reliability of the F-SCCH with physical layer ARQ.

Still further techniques will now be described. In an embodiment, the R-auxACKCH and/or R-scchACKCH may be transmitted over unused R-ACKCHs. For example, consider a typical 3GPP2 UMB system. In particular, the forward link channel resources may be measured in units of channel resources, which will also be referred to as a node or tile. When scheduling a terminal on the forward link, the scheduler may assign a certain number of channel resource units (CRU) to transmit data to the AT. The system typically reserves a R-ACKCH for each forward link CRU. Further, each R-ACKCH is used to ACK or NAK F-DCH packets sent over each CRU such that there is a one-to-one mapping. When more than one CRU is assigned to an AT, the AT has be ability to use more than the R-ACKCHs. However, since only one R-ACKCH is typically needed per F-DCH packet, irrespective of the number of CRUs used, there are extra unused R-ACKCHs when more than one CRU is used.

If there are extra unused R-ACKCHs for a particular F-DCH (for data packets sent to a particular AT), one or more of the other unused R-ACKCHs may then be used to send the scchACKCH or auxACKCH. Which of the unused R-ACKCH to use for sending the scchACKCH and/or auxACKCH is synchronized between the system and terminal. Any of the unused R-ACKCHs can be used as long as the rule is pre-defined.

For example, the R-ACKCH corresponding to the F-DCH CRU may be sent on the "left-most" CRU (node) given a set of CRUs (nodes) listed from left to right. When more than one CRU is used, the "right-most" CRU could be used to represent the R-auxACKCH and/or R-scchACKCH. In another example, the R-ACKCH corresponding to the "second left-most" CRU can be used to send the R-auxACKCH and/or R-scchACKCH.

Further techniques include sending a pre-emptive scchACKCH on this extra-resource immediately after SCCH received, and sending a pre-emptive auxACKCH the extra-resource as well.

The described approaches may be generalized for MIMO operation, and for H-ARQ for the SCCH. To protect the situation in which there is multiple-code word (MCW) or space division multiple access (SDMA), an alternative rule is to go from the right.

Examples of upper layer messages or predefined rules which may be implemented to support F-PDCCH and F-SCCH management will now be described. Upper layer messages may be configured to indicate to the terminal various type of information including, for example, threshold data rates, threshold payload sizes, threshold node (CRU) assignments which when exceeded indicates that R-scchACKCH shall be activated, and combinations thereof.

In addition, forward link upper layer messages may be further configured to indicate whether the network supports SCCH management feature such as if the AN supports the auxACKCH and/or scchACKCH, whether the terminal should use this feature (e.g., if the AT should enable or disable the auxACKCH (auxackch) and/or the scchACKCH (scchackch).

Moreover, reverse link upper layer messages may be configured to indicate whether the terminal supports these features and/or channels.

Another example of an upper layer message that may be implemented includes an indication that the terminal should boost the Tx power of the auxACKCH and/or scchACKCH transmissions and/or by how much such power is to be increased (e.g., 1 dB, 3 dB, and the like).

If desired, upper layer messages or a predefined rule understood by both the AT and AN may also indicate one or more of the following:

Which R-scchACKCH maps to which F-SCCH (e.g., R-scchACKCH_0 maps to F-SCCH (F-PDCCH)_0);
Which F-SCCHs are assigned a corresponding R-scchACKCH; in this case, the mapping may be made uniform for each frame or the mapping can be made specific to each frame number in a super-frame;
Which R-ACKCH resource is assigned for each R-scchACKCH (e.g., "R-scchACKCH_0_resource number" flag (for example, this could be a number between 0 to 31 using an 8-bit value to indicate which R-ACKCH number should be assigned for R-scchACKCH_0);
Which F-SCCHs can use R-scchACKCHs (e.g., "F-SCCH_0_ACK_activated" flag (0 means the AT shall not send an R-scchACKCH in response if the AT is scheduled over F-SCCH_0, and 1 means the AT shall use the R-scchACKCH in response if the AT is scheduled over F-SCCH_0);
How many R-scchACKCH are needed;
If the base station supports this feature (the forward link message which can be broadcast, multicast or unicast);
If the AT supports this feature (reverse link message) (e.g., R-scchACKCH_supported (0 for no and 1 for yes));
If an AT should activate its R-auxACKCH and/or R-scchACKCH; this indication would typically be implemented with an AT specific forward link message (e.g., a flag called "R-scchACKCH_activate" flag (0 for do not activate and 1 for activating)).

Another aspect relates to channel encoding of an acknowledgement channel with a CRC or block code to increase the reliability of ACK reception.

One embodiment for assigning auxACKCH/R-scchACKCH is by mapping assigned traffic channel resources to a set of ACKCHs. This set of ACKCHs is used for acknowledging forward link data, and acknowledging the assignment. One example of this approach is shown below for MIMO multi-code word (MCW) and space-division multiple access (SDMA) operation. In contrast to single-input single-output (SISO) operation which typically requires at most one R-ACKCH for the F-PDCH, MCW and SDMA will usually require more than one R-ACKCH for data acknowledgment.

In a four-layer MCW, four R-ACKCHs would typically be implemented. In this case, the use of "leftover" R-ACKCHs (as described above) to carry the R-scchACKCH would be possible if five or more base nodes are assigned to the terminal. When four or fewer base nodes are assigned, then an alternate technique (such as increasing signaling states described above, or allocating an additional ACKCH for assignment acknowledgement) of carrying the R-scchACKCH would typically be implemented.

Another alternative is to only support R-scchACKCH when there are leftover base nodes available. For example, in the just-described four-layer MCW example, if four or fewer base nodes are assigned, then the R-scchACKCH is not allowed. If desired, similar techniques may also be applied to the R-auxACKCH.

Another embodiment of assigning auxACKCH/R-scchACKCH is by mapping SCCH (control channel for assignment) resources to a set of unused ACKCHs. One SCCH assignment block which requires acknowledgment will have one ACKCH mapped to it, for acknowledging the assignment carried in the block. In such a case, if there are three F-SCCHs, then each would have assigned its corresponding R-ACKCH. A scheduled AT would then send its scchACK on the R-ACKCH.

An R-scchACKCH ACK need not be sent if any subpacket of the F-DCH (F-PDCH) is decoded and where an ACK is sent over the R-ACKCH. Alternatively, both the R-scchACKCH and the R-ACKCH ACKCH can operate independently.

In the event of a de-assignment F-SCCH message, the AT can also send a R-scchACKCH. This indicates to the BS that the AT did indeed receive the de-assignment message. This message can be power-boosted for further reliability Each F-SCCH will typically have a corresponding R-scchACKCH activated. For example, an AT with an unreliable link could be assigned to an F-SCCH which has the R-scchACKCH feature activated, such that an AT with a reliable link could be assigned to an F-SCCH which does not have the R-scchACKCH feature activated.

Furthermore, for a UMB system, various assignment type messages exist for which the R-scchACKCH would be useful. In general, these messages would include forward link SISO assignment messages, forward link SDMA assignment messages, forward link MCW assignment messages, and forward link SCH assignment messages, among others.

To enhance operation and reliability, the AT may send the R-auxACKCH with boosted power to reduce probability of detection failure. Alternatively or additionally, the AN may send the F-SCCH with boosted power when a R-scchACKCH NAK is received.

In a similar manner, to enhance operation and reliability, the F-SCCH Tx power may be boosted when a R-scchACKCH NAK is received and when the packet termination is not desired. In this case, the same F-SCCH is typically retransmitted and the same first sub-packet of the F-DCH is retransmitted. In this scenario, when the AT receives the same F-SCCH, the AT can soft-combine the earlier subpacket in the case where the same first subpacket is transmitted twice.

One embodiment implements sending the auxACKCH (ON) after the F-PDCCH (SCCH) is successfully received. In this embodiment, the scheduler can resend the F -PDCCH (SCCH) if NAK is received on R-scchACKCH. Otherwise, the scheduler continues sending subpackets to the terminal which has no knowledge that it should be decoding the F-PDCH sub-packets. This feature allows for more efficient utilization of the F-PDCH resources, and thus, less waste when the terminal misses the F-PDCCH (SCCH).

A similar implementation may be utilized for R-PDCH operation. If the terminal receives the F-PDCCH (SCCH), then the terminal can send the auxACKCH (ON) to indicate to the receiver that the terminal did receive the F-PDCCH. Thus, the terminal is confident in continuing R-PDCH transmissions.

When H-ARQ with step-down modulation is used, there typically exists a number of transmission formats which the terminal cannot decode with the first subpacket only. According to this aspect, the terminal would typically receive the first and second subpacket before implementing decoding operations for the encoder packet. In such a situation, since no signal is sent on the ACKCH after the first subpacket, the auxACKCH could be sent on the ACKCH PHY layer channel after the first subpacket using the resource allocated for data acknowledgement. Alternatively, the auxACKCH could be sent using other techniques, such as those described above. A benefit of this technique is that the transmitter is confident that the receiver received the PDCCH before sending the second subpacket. This typically results in a reduction of resource waste. Examples for the F-PDCH and R-PDCH are as follows.

This technique may be applied to the F-PDCH by having the terminal send an F-PDCCH ACK as an ON on the R-ACKCH (which is unused for the first subpacket which is undecodable). Accordingly, the scheduler may save resources since it now realizes that continuing transmission of the F-PDCH would be ineffective.

Such techniques may also be applied to the R-PDCH by having the terminal send a F-PDCCH ACK as an ON on the R-auxACKCH simultaneously with the first sub-packet transmission instant on the R-PDCH. This allows the AN to realize that it should not expect to receive any R-PDCH sub-packets and can schedule another terminal or reschedule the same terminal.

If desired, ACK signal detection can be made more reliable by encoding it with a cyclic redundancy code (CRC) and/or with AT specific scrambling. In some cases, the NAK has been assumed as being assigned to an OFF value. However, it should be understood that the techniques disclosed herein may also be applied to the cases in which the NAK does not represent OFF, but instead some signal with energy. An example is with BPSK signaling which utilizes +1 to represent ON and −1 to represent OFF.

It is generally useful to implement the R-auxACKCH in the case that the AT has different serving sectors for forward and reverse links. Since the R-ACKCH is typically only used for the forward link serving sector, only the serving sector will perform the outer loop power control. The reverse link serving sector usually will not use the R-ACKCH for outerloop power control, nor does it receive a forward link channel quality indicator from the AT. Hence the reverse link serving sector does not have sufficient information to power control the PDCCH (SCCH) for reverse link assignments to an AT. In this case, the R-auxACKCH can be used to control the PDCCH (SCCH) FER of the assignment blocks for reverse link. This is relevant since the R-CQICH reported for the non-forward link serving sectors may be relatively slower. In general, the R-auxACKCH enable the AT to control the SCCH from the reverse link serving sector in the case the forward and reverse link serving sectors are different.

Various options may be implemented for R-auxACKCH PHY layer design including, for example, reusing the R-ACKCH, reusing the R-CCH (the CDMA segments for other RL logical control channels), and creating an additional PHY layer channel.

With regard to reusing the R-CCH, the same 1024-ary signaling code may be used as described for R-CCH. In an implementation, a single code is used for a coding rate of (1024, 1), for example, using all 1s Walsh code. ON-OFF keying may be used where energy is applied to the single code to acknowledge SCCH assignments. Support of up to two R-auxACKCHs per AT to support SCCH control may also be used in the disjointed case, such as the following:

R-auxACKCH_0—for the forward link serving sector
R-auxACKCH_1—for the reverse link serving sector if different.

With this approach, at the receiver, energy at the output of the single (1024, 1) code filter and the remaining 1023 code filter outputs (or some subset) can be compared for more reliable estimation and erasure rate control.

Concerning R-auxACKCH timing, to reduce BS Rx complexity, the R-auxACKCH timing can be predefined or signaled through the overhead message. For example, the AT may be constrained to transmit the R-auxACKCH after it receives an SCCH (after the AN sends the SCCH) in parallel with the first R-ACKCH or final R-ACKCH NAK (which occurs when the AT exceeds the maximum number of retransmissions), or to transmit the R-auxACKCH after it has received N sub-packets but still is unable to decode the packet (with N configurable).

Addressing further the R-auxACKCH, transmitting the R-auxACKCH when a number (N) of retransmissions is exceeded will provide various advantages such as minimizing R-auxACKCH transmissions, overhead, the effect on reverse link capacity, and battery power consumption. The greater the value N, the above benefits are also greater. However, a greater N also causes the delay for the AN to detect that its assignments was missed by the AT, resulting in possible waste of traffic channel resources.

To minimize delay and the undesirable situation in which the SCCH is missed and the scheduler wastes a number of DCH sub-packets, the R-auxACKCH may also be transmitted after the first sub-packet is received in parallel with the first R-ACKCH.

If the reverse rate indicator (RRI) is implemented, this could affect the need for the R-auxACKCH since the RRI could be used as an implicit R-auxACKCH for SCCH FER control.

Furthermore, the R-auxACKCH may be AT specific or shared among various ATs. If AT specific R-auxACKCH is used, a more accurate estimate of the required bitmap Tx power is typically possible using a combination of each of CQICH and R-bitmap NAK reported. The R-scchACKCH, in some cases, is more useful when the R-CQICH transmission frequency is slow (e.g., once per 6 or 8 frames, or once per super-frame).

It should be noted that the various embodiments presented herein may be generalized for other binary signaling schemes, beyond OOK. Examples of such techniques include BPSK signaling, binary orthogonal modulation, and the like.

Figure 4:
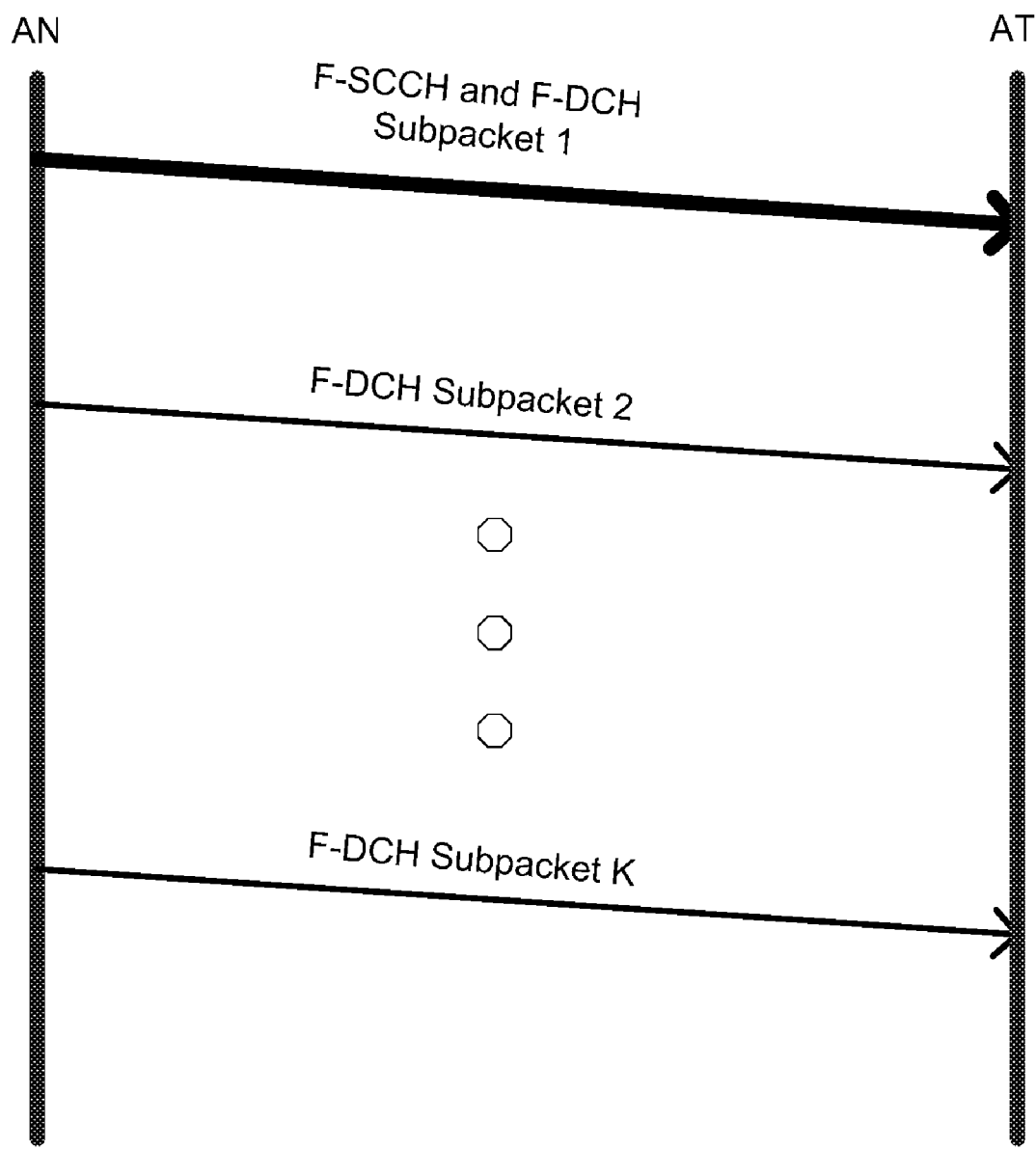
Figure 5:
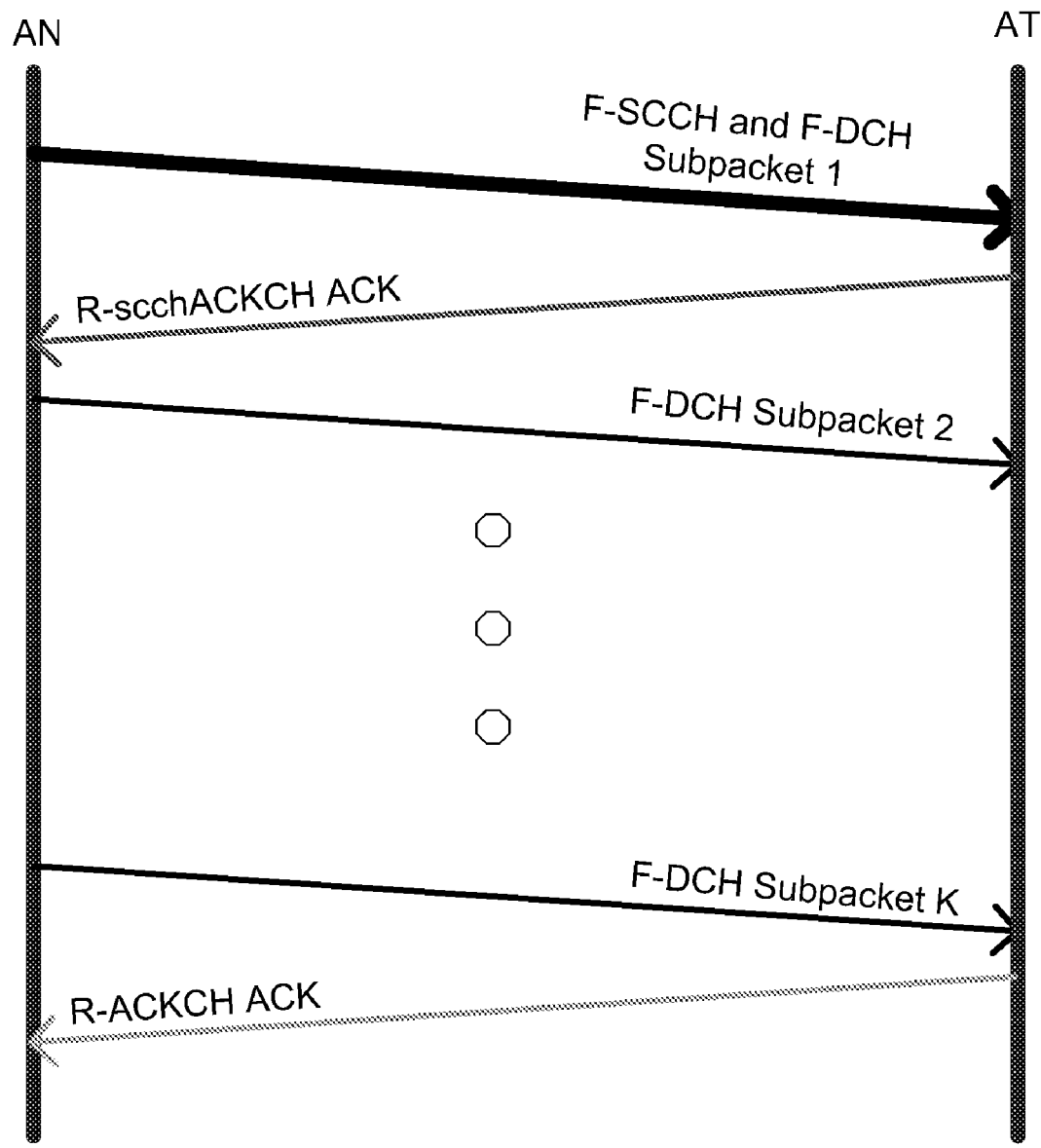
FIG. 5 depicts an example of sending an R-scchACKCH ACK if the first subpacket cannot be decoded.

In view of the forgoing, several examples will new be described in more detail. FIG. 4 depicts the situation in which the AN sends the F-SCCH and K F-DCH subpackets to the AT. Further to this figure, FIG. 5 depicts an example of sending an R-scchACKCH ACK if the first subpacket cannot be decoded. In particular, the AT is shown receiving the first subpacket of the F-DCH, and then sending to the AN an R-scchACKCH ACK.

Figure 6:
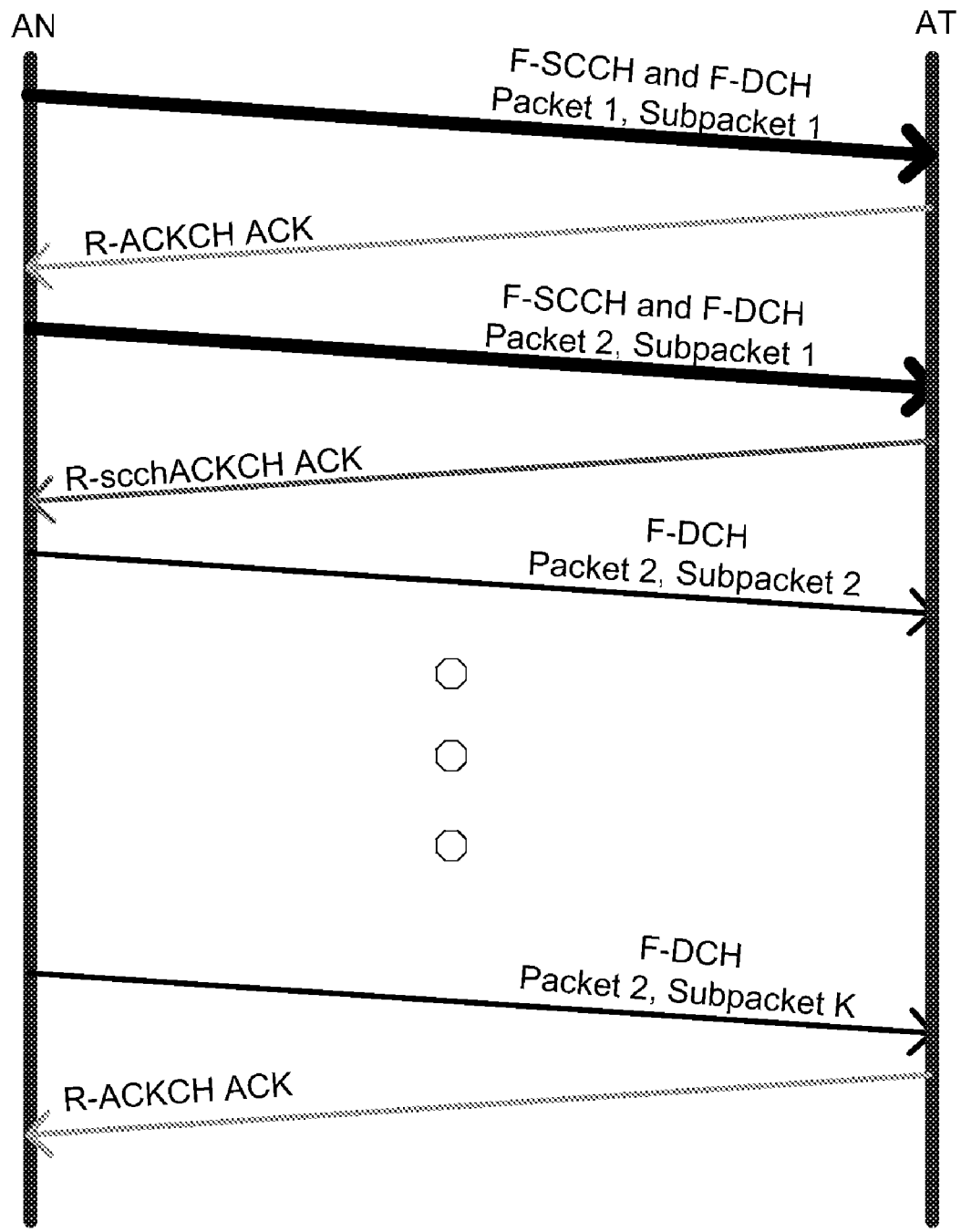
FIG. 6 depicts an example of sending an R-ACKCH ACK if the AT first subpacket is successfully decoded.

FIG. 6 depicts an example of sending an R-ACKCH ACK if the AT first subpacket is successfully decoded. The R-ACKCH ACK indicates that the F-SCCH was decoded. The AN then sends to the AT the first subpacket of packet 2. At this stage, which is similar to FIG. 5, the AT sends an R-scchACKCH ACK to the AN if the first subpacket of packet 2 cannot be decoded.

Figure 7:
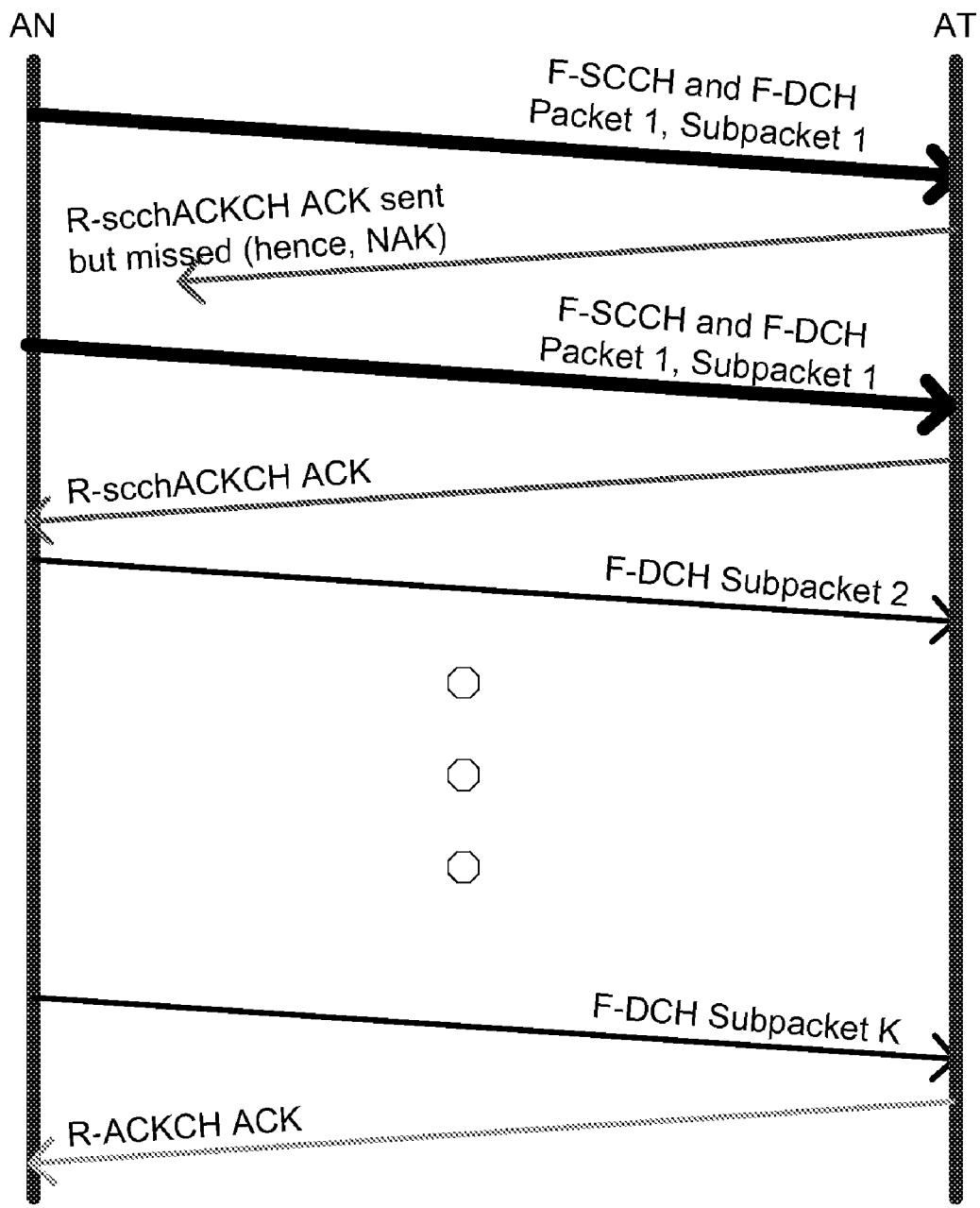
FIG. 7 depicts an example in which the AT sends to the AN an R-scchACKCH ACK, but the AN never receives this signal (thus indicating a NAK).

FIG. 7 depicts an example in which the AT sends to the AN an R-scchACKCH ACK, but the AN never receives this signal (thus indicating a NAK). In response, the AN resends the F-SCCH and the F-DCH first subpacket of packet 1 to the AT. Further operation may proceed in a manner described in conjunction with FIG. 5. Note that either the same AT is rescheduled or a new AT is scheduled incurring a loss of one subpacket Tx instance.

Figure 8:
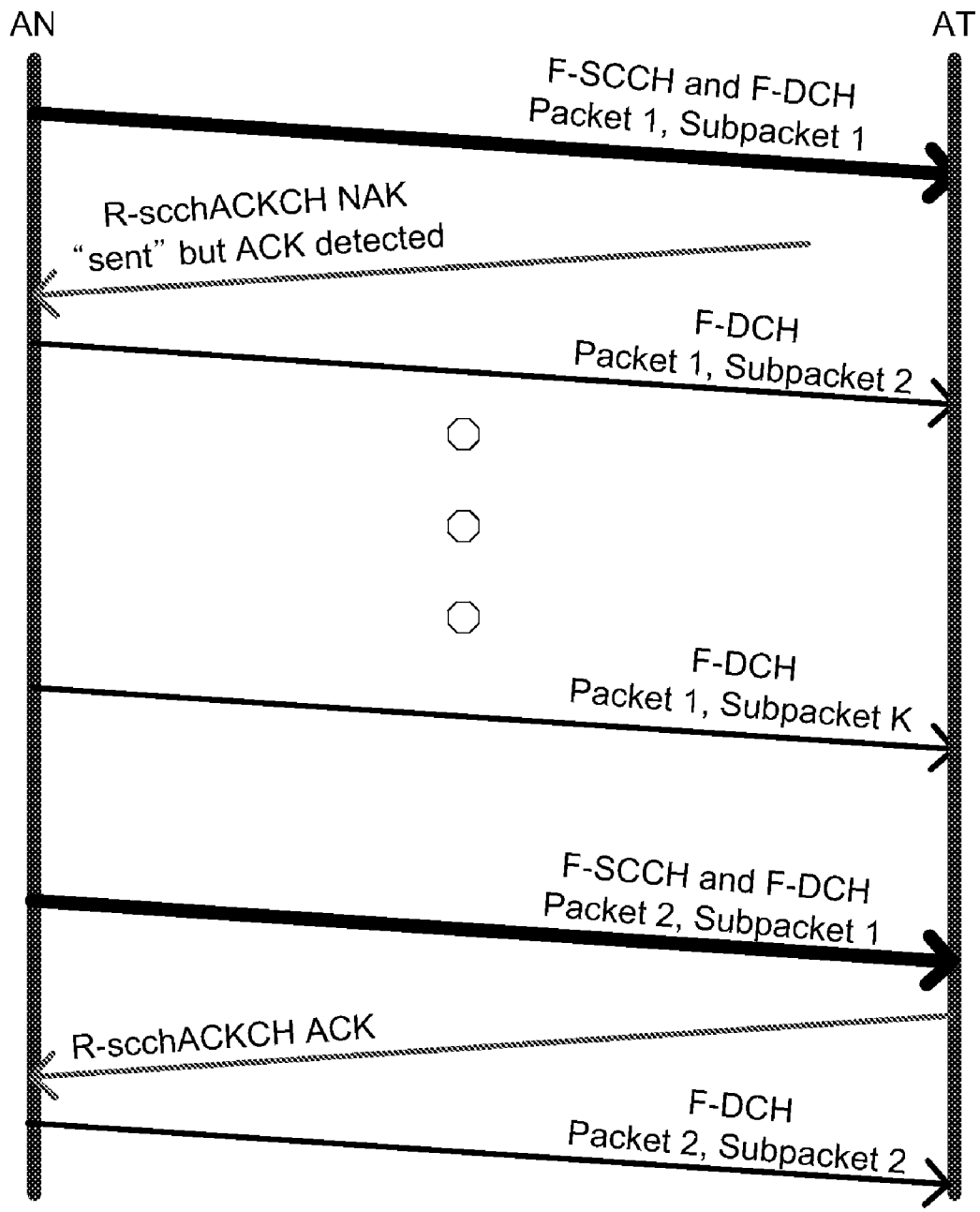
FIG. 8 depicts an example of a false alarm in which the AT sends to the AN an R-scchACKCH ACK, but the AN receives this as an R-scchACKCH NAK.

FIG. 8 depicts an example in which the AT sends to the AN an R-scchACKCH NAK, but the AN receives this as an R-scchACKCH ACK. In response, the AN continues to send the F-DCH subpackets to the AT. The AN later sends to the AT the F-SCCH and F-DCH first subpacket of packet 2 and operations may proceed in a manner described in conjunction with FIG. 5. In this example, operation falls back to the case of the R-scchACKCH as having never existed.

Figure 9:
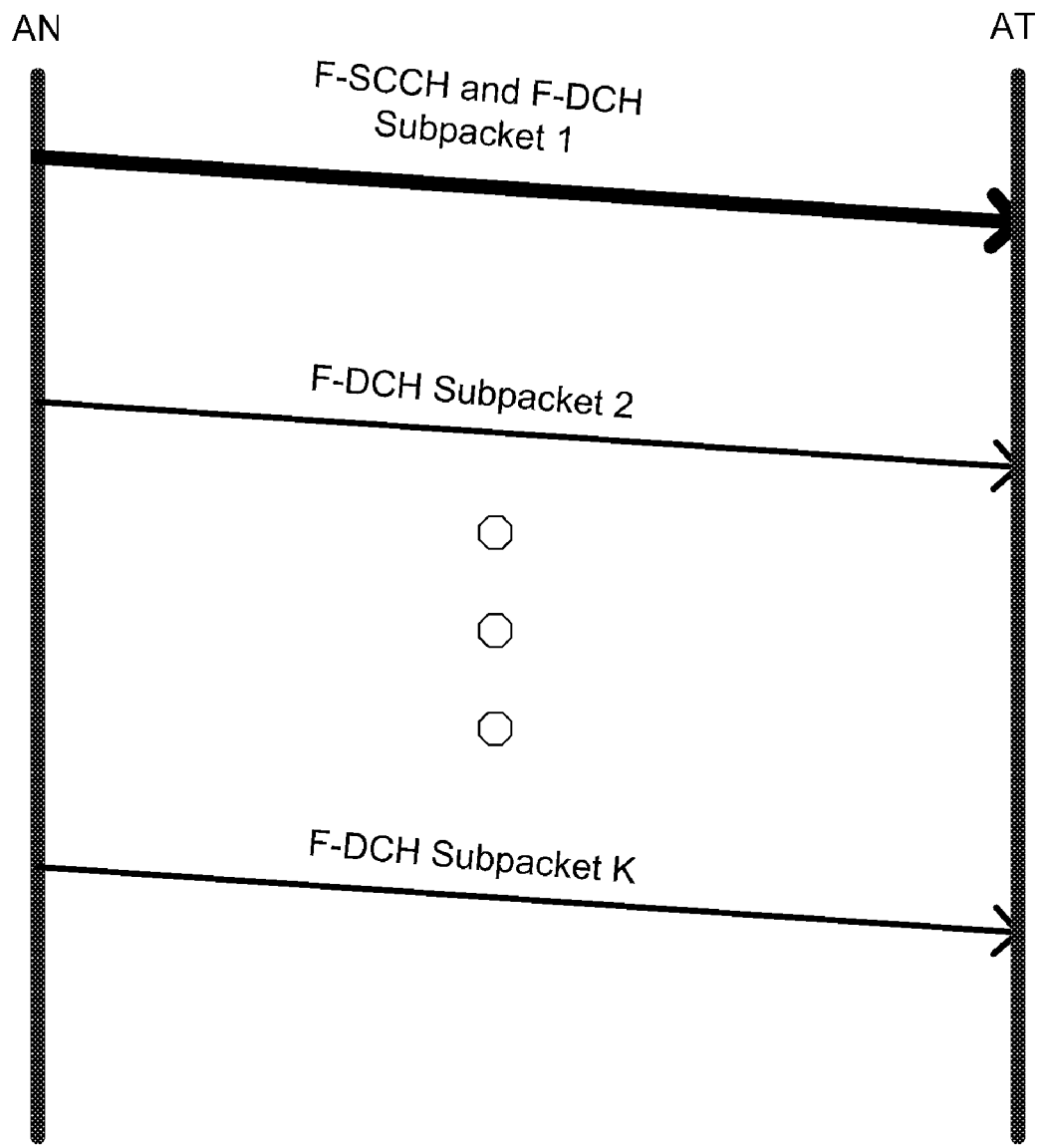
FIG. 9 depicts an example in which the F-SCCH is missed by the AT, and consequently the F-DCH is also missed.

FIG. 9 depicts an example in which the F-SCCH is missed by the AT, and consequently the F-DCH is also missed.

Figure 10:
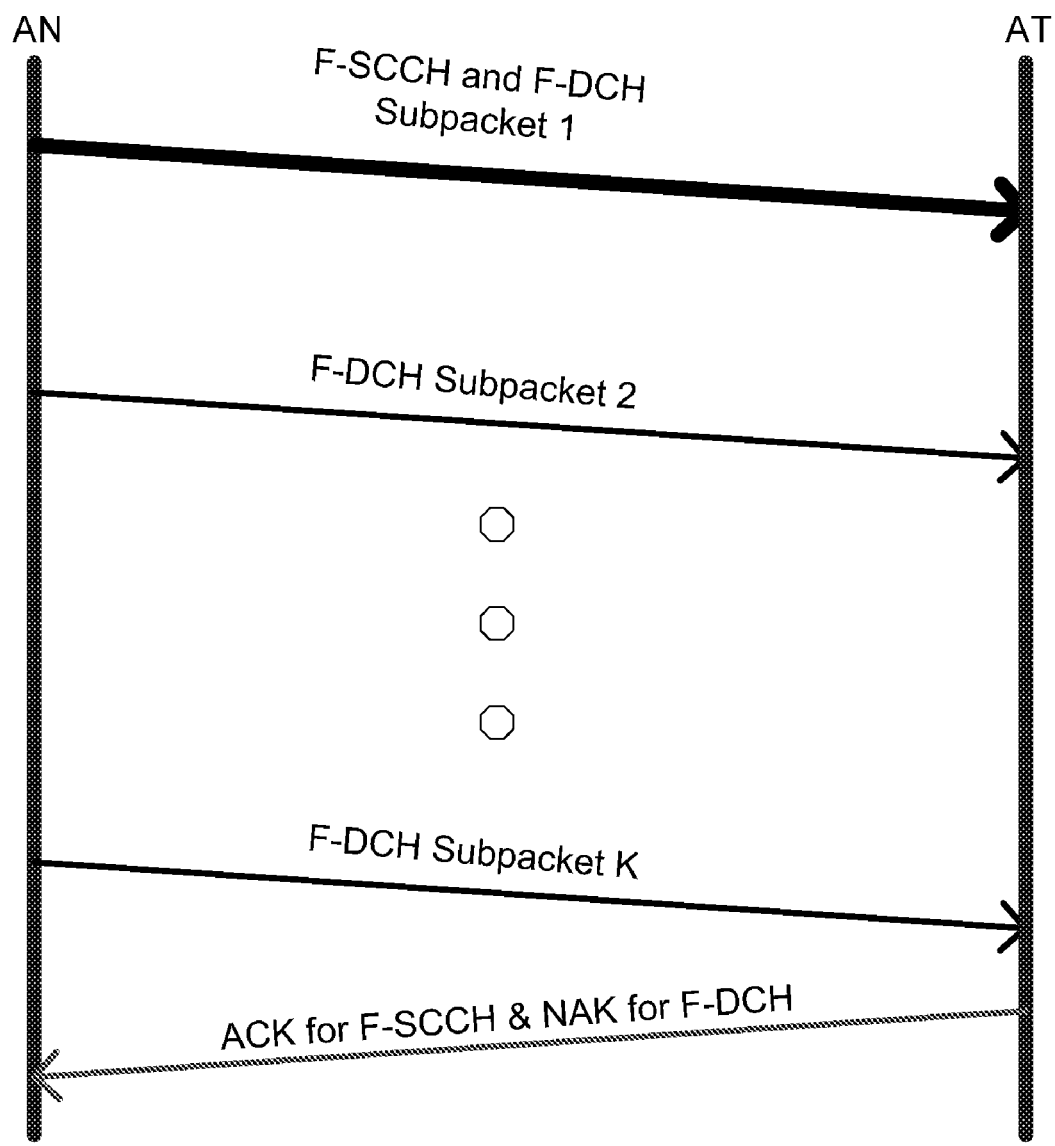
FIG. 10 depicts an example in which the F-SCCH is detected by the AT, but the F-DCH is missed.

FIG. 10 depicts an example in which the F-SCCH is detected by the AT, but the F-DCH is missed. In this example, if the AT misses the F-DCH after the maximum number of subpacket transmissions, then the AT sends an ACK for the F-SCCH and an NAK for the F-DCH.

Figure 11:
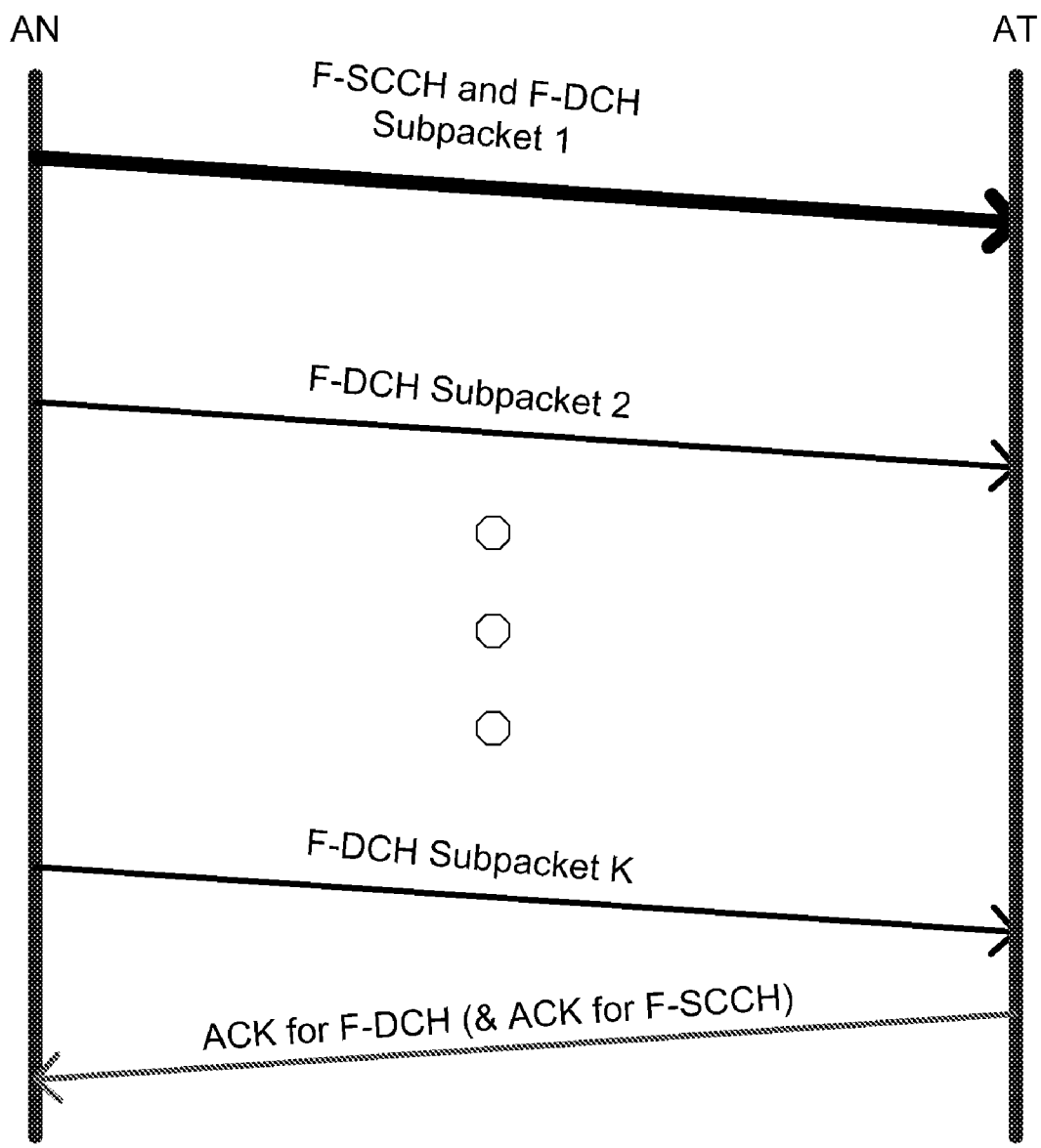
FIG. 11 depicts an example in which the F-SCCH is detected by the AT and the F-DCH is decoded successfully.

FIG. 11 depicts an example in which the F-SCCH is detected by the AT and the F-DCH is decoded successfully. In this example, the AT sends an ACK for the F-DCH (R-ACKCH ACK). This inherently indicates an ACK for the F-SCCH.

The scchACKCH resource allocations for a sector are broadcasted to the ATs which are communicating with a sector. This sector may include a forward link sector, a reverse link sector, or the sector to which an access probe is sent.

The parameters may include one or more of whether the feature is activated for this sector; whether the feature is supported by this sector, cell, or AN; the time offset between the receiving SCCH and the transmitting SCCHAck. Note that this information can be omitted if there is an implicit rule that specifies the offset (e.g., the offset is the same as the offset between a SCCH and the first forward/reverse link sub-packet.) For example, the R-scchACKCH may be sent after the first subpacket is received, or after the second subpacket is received, or after the M_max th subpacket is received given ARQ operation allowing a maximum of (M_max −1) sub-packet retransmissions. As indicated above, this timing value of M can be configured.

Further, each SCCH can be assigned a different value of M. For example, SCCH_0 may be assigned M=1 whereas SCCH_1 may be assigned M=M_max. With the former, the AT scheduled on SCCH_0 would respond with a R-scchACKCH ACK after the first subpacket is received and if it fails to decode (no R-ACKCH ACK sent after the first subpacket). With the latter, the AT scheduled on SCCH_would respond with a R-scchACKCH ACK after the M_max th subpacket is received, and if it fails to decode (no R-ACKCH ACK sent after M_max th subpacket). The smaller the value of M, the smaller the waste of forward link resources, but the greater the reverse link R-scchACKCH signaling overhead. The larger the value of M, the larger the waste of forward link resources, but the smaller the reverse link R-scchACKCH signaling overhead.

The resource assignment for the scchACKCH is typically associated with a particular SCCH. For example, an unused reverse link resource (e.g., unused and/or permanently left-over R-ACKCH resources used to acknowledge the packet data channel F-DCH) could be assigned to carry the scchACKCH. The situation may arise in which no resource is assigned for a scchACKCH associated with a SCCH. This implies that the scchACKCH for this SCCH is not activated.

For a particular type of SCCH received, the scchACKCH is sent. For example, the SCCH can be a FLAB, RLAB, access grant, or a LAB for persistent or non-persistent assignments. This information specifies for which type or types of assignment or control message/block the ACK should be sent. The scchACKCH may be enabled based on geometry. For example, a CQI threshold can be defined such that the AT would only be required to send an scchACKCH if the CQI is above a certain value. A benefit of this feature is to conserve battery power and reduce interference.

The scchACKCH may be enabled based upon the size of resource assignment. For example, a node threshold can be defined such that the AT would only be required to send the scchACKCH if the number of assigned nodes is above a certain value. This is because the use of the scchACKCH has more gain when an AN uses it to decide whether another SCCH is needed before the termination of the current large assignment. This feature reduces the amount of wasted resources.

The above identified information may be specified in a loop with N iterations. The number N can be less than or equal to the maximum number of SCCHs. For example, if SCCHAck parameters are specified in a different message B than the message A which specifies the assignment of SCCH (including the number of activated SCCH blocks), and the frequency of message A is higher than message B, it is useful to set N to the maximum number of SCCH blocks allowed such that the AT can use a cached message B to determine the SCCHAck parameters for the newly added SCCHs. An additional field may be included to specify the number N, if it cannot be inferred implicitly.

The identified parameters may be transmitted in a broadcast message such as a QuickChannelInfo, ExtendedChannelInfo, SectorParameters, and AccessParameters message, among others. The SCCHAck is typically not applied to a SCCH with broadcast MACID (i.e., a broadcast SCCH).

For more dynamic activation/deactivation of this feature, an extra bit can be defined for each type of SCCH. This bit specifies whether an ACK is needed after receiving the SCCH. The SCCHAckCh parameters for a sector may also be broadcasted to neighboring or nearby sectors to facilitate handoffs.

Some of the identified information may also be configured on a per-AT basis, in the form of configuration attributes. For example, an attribute or a field in a complex attribute may indicate whether the AT has this feature enabled (e.g., SCCHAckChEanbled), and another attribute or field to indicate which types of SCCH the AT will need to respond with scchACKCH. The scchACKCH may be enabled based on geometry on per AT basis. For example, a CQI threshold can be defined as an attribute such that the AT would only be required to send the scchACKCH if the CQI is above a certain value. This feature conserves battery life.

In the case that the power headroom is insufficient, or in a low battery condition, the AT may disable the feature by initiating a configuration process to change the SCCHAckChEanbled to false.

For stable and efficient system operation, it is useful to manage the FER and Tx power of the F-DCH, as well as the forward link shared control channel (F-SCCH). The F-SCCH generally sends various forward link assignment massages include the forward link LAB, SCW LAB, MCW LAB, and the like. As an example, the FLAB on the F-SCCH may be used to identify (wake up) a scheduled AT and for packet reception on the F-DCH.

FIG. 12 depicts fields in an message such as an ExtendedChannelInfo message.

The SCCHAckCHActivated field indicates whether the SCCHAckCHIncluded and the SCCHAckCHNode fields are implemented when the SCCHAckCHActivated field is set to 1. When the SCCHAckCHActivated field is set to 0, this indicates that the sector does not support this feature.

The Nth occurrence of the illustrated message indicates whether the SCCHAckCH for Nth SCCH is activated and where the SCCHAckCH is located. The SCCHAcKNode x is the ACK channel corresponding to node x in the forward link node tree. The maximum number of occurrences of mapping (e.g., 8) are depicted. This is because QuickChannelInfo for SCCH assignment is typically more frequent than ExtendedChannelInfo. The AT may send the SCCHAck during circumstances such as when the F-SCCH is decoded, the F-SSCH has a SCCHAckCH assigned, and for a NAK for the F-DCH.

Figure 13:
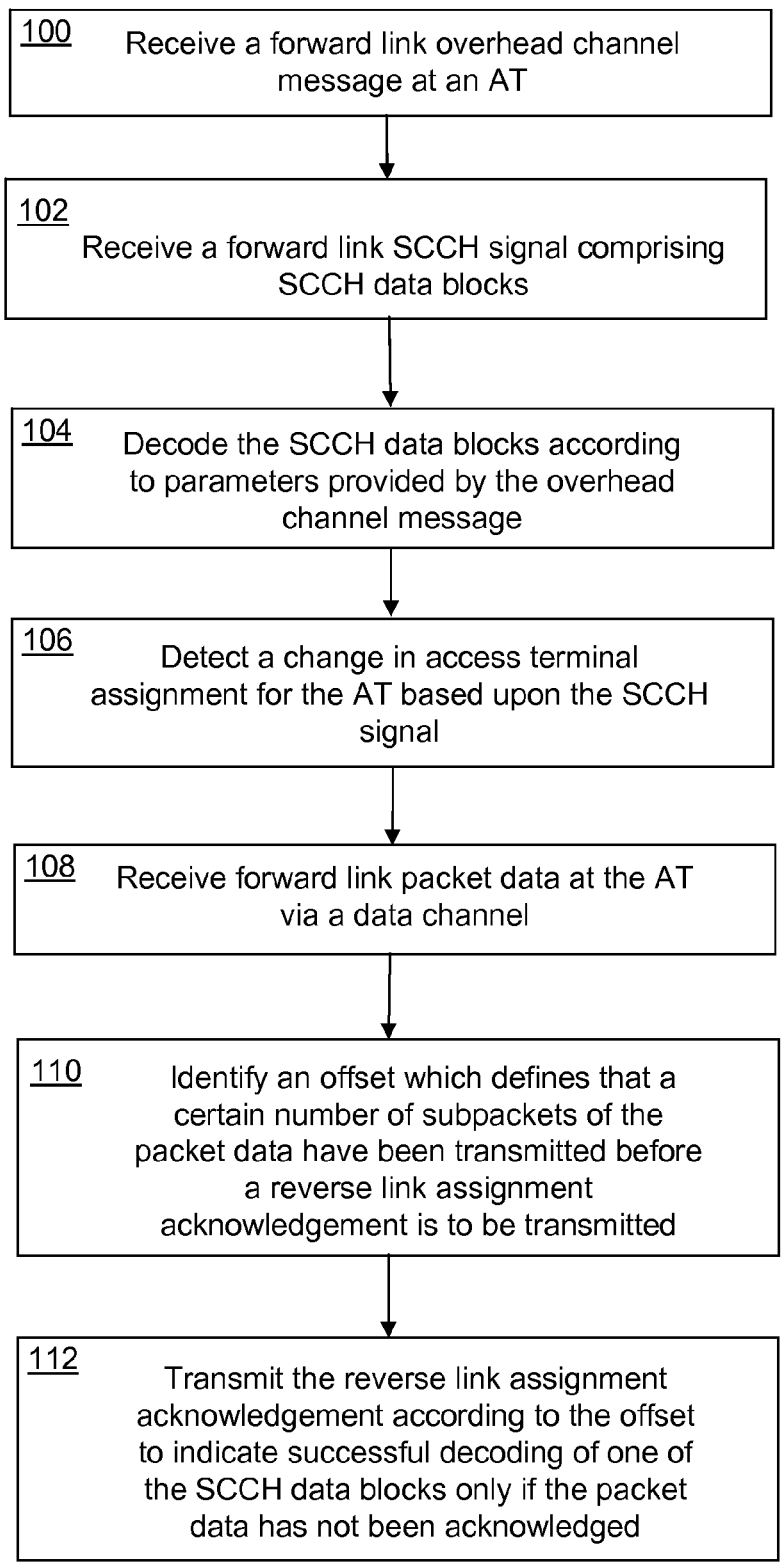
FIG. 13 is a flowchart depicting a method for providing assignment acknowledgement in accordance with an embodiment of the present invention.

FIG. 13 is a flowchart depicting a method for providing an assignment acknowledgement in accordance with an embodiment of the present invention. Block 100 includes receiving a forward link overhead channel message at an access terminal (AT), the overhead channel message comprising a parameter used to indicate which shared control channel (SCCH) message data blocks are to be acknowledged by the AT. Block 102 recites receiving a forward link SCCH signal comprising SCCH data blocks.

Block 104 recites decoding the SCCH data blocks according to parameters provided by the overhead channel message. Block 106 relates to detecting a change in access terminal assignment on the forward link data channel for the AT based upon the SCCH signal. Block 108 depicts receiving forward link packet data at the AT via a data channel. Block 110 includes identifying an offset which defines that a certain number of subpackets of the packet data have been transmitted before a reverse link assignment acknowledgement is to be transmitted. In addition, block 112 recites transmitting the assignment acknowledgement according to the offset to indicate successful decoding of one of the SCCH data blocks only if the packet data has not been acknowledged.

Figure 14:
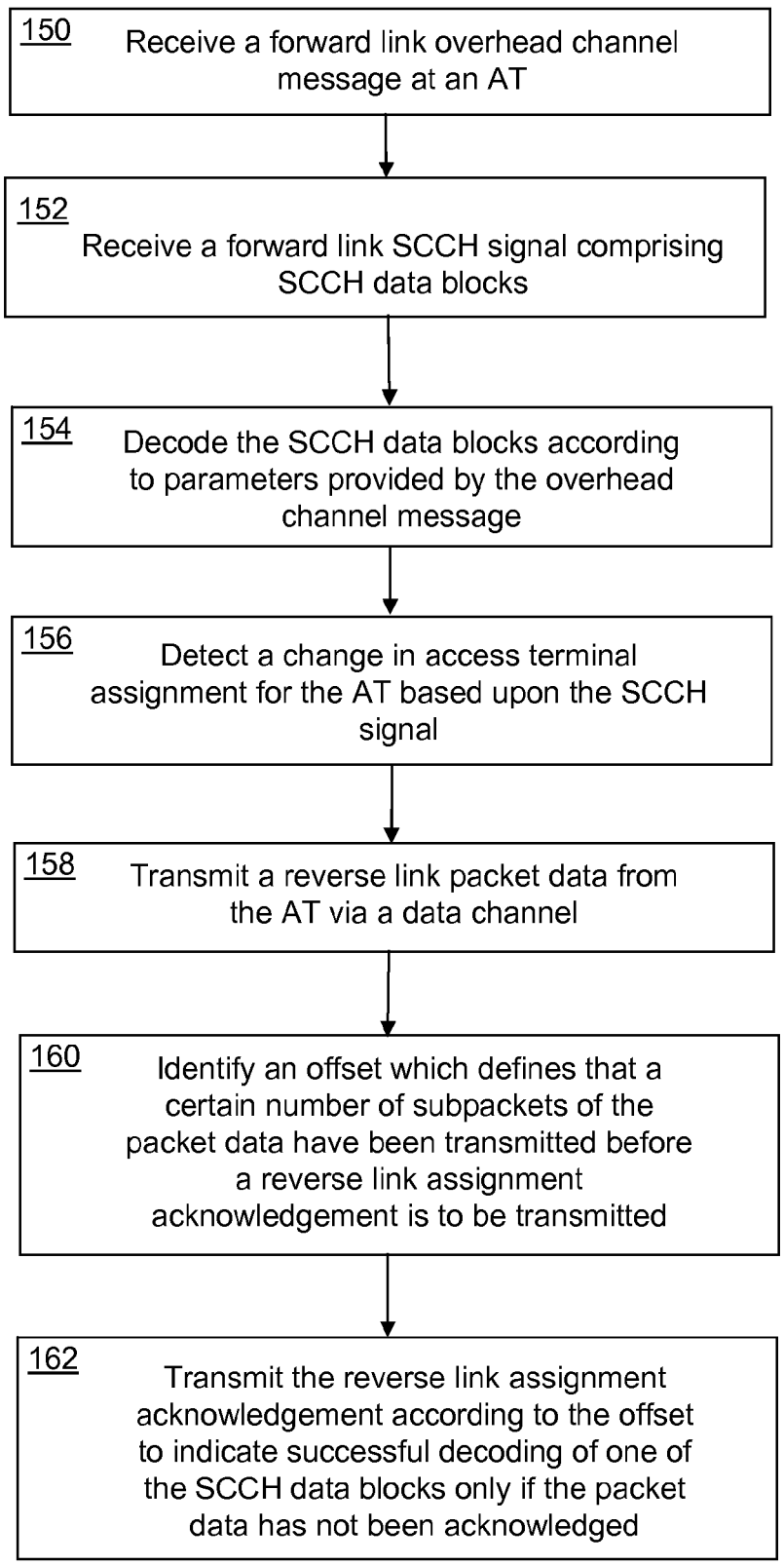
FIG. 14 is a flowchart depicting a method for providing assignment acknowledgement in accordance with another embodiment of the present invention.

FIG. 14 is a flowchart depicting a method for providing an assignment acknowledgement in accordance with another embodiment of the present invention. Block 150 recites receiving a forward link overhead channel message at an AT, the overhead channel message comprising a parameter used to indicate which shared control channel (SCCH) message data blocks are to be acknowledged by the AT. Block 152 recites receiving a forward link SCCH signal comprising SCCH data blocks. Block 154 includes decoding the SCCH data blocks according to parameters provided by the overhead channel message. Block 156 states detecting a change in access terminal assignment on the reverse link data channel for the AT based upon the SCCH signal. Block 158 includes transmitting reverse link packet data from the AT via a data channel. Block 160 includes identifying an offset which defines that a certain number of subpackets of the packet data have been transmitted before an assignment acknowledgement is to be transmitted. In addition, block 162 indicates transmitting the reverse link assignment acknowledgement according to the offset to indicate successful decoding of one of the SCCH data blocks only if the packet data has not been acknowledged.

Although embodiments of the present invention may be implemented using the exemplary series of operations described herein, additional or fewer operations may be performed. For instance, one or more of the operations depicted in, for example, FIG. 13 blocks 100, 104, 106, and 110 may be omitted. Another example includes omitting one or more operations depicted by blocks 150, 152, 156, and 160 of FIG. 14. Moreover, it is to be understood that the order of operations shown and described is merely exemplary and that no single order of operation is required.

Figure 15:
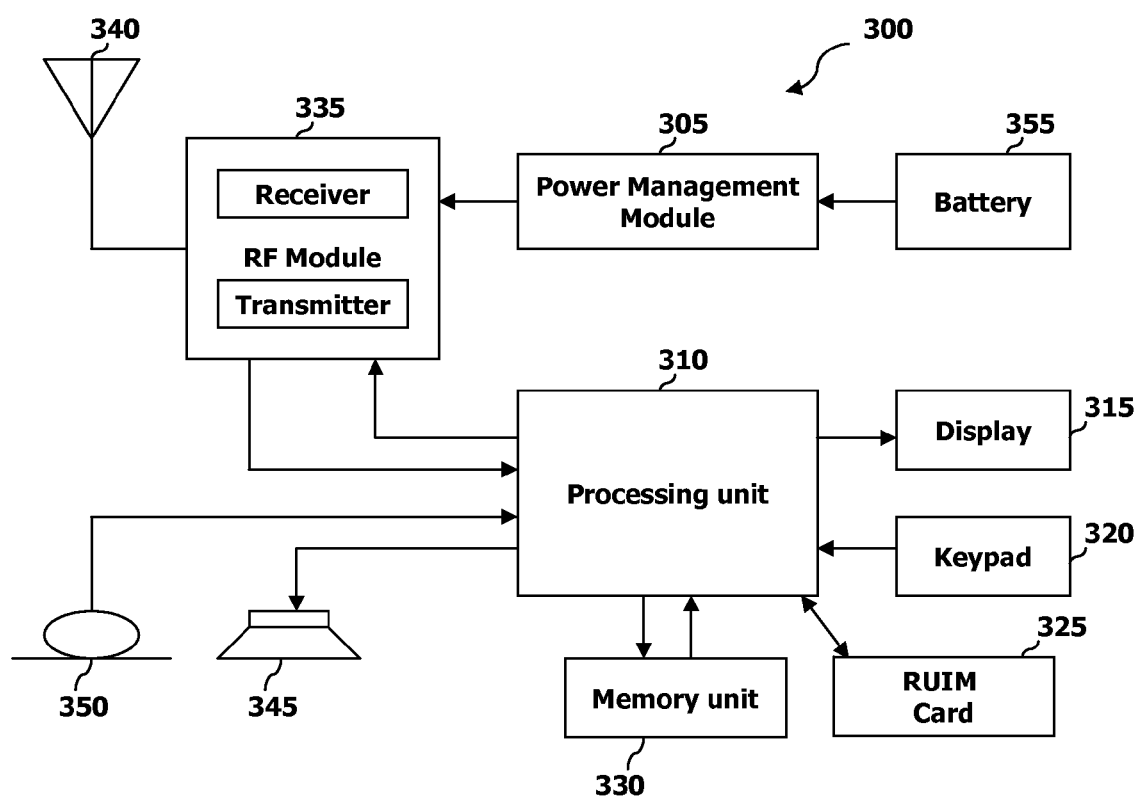
FIG. 15 is a block diagram of a mobile communication device which may be configured as an access terminal in accordance with embodiments of the present invention.

FIG. 15 is a block diagram of mobile communication device 300, which may be configured as a AT in accordance with embodiments of the present invention. Device 300 is illustrated, for example, as a mobile phone and may be configured to perform various methods described herein. The mobile communication device 300 includes a processing unit 310 such as a microprocessor or digital signal processor, RF module 335, power management module 305, antenna 340, battery 355, display 315, keypad 320, optional removable user identity module (RUIM) card 325, memory unit 330 such as flash memory, ROM or SRAM, speaker 345 and microphone 350.

A user enters instructional information, such as a telephone number, for example, by pushing the buttons of keypad 320 or by voice activation using microphone 350. Processing unit 310 receives and processes the instructional information to perform the appropriate function, such as to dial the telephone number. Operational data may be retrieved from memory unit 330 to perform the function. Furthermore, processing unit 310 may display the instructional and operational information on display 315 for the user's reference and convenience.

Processing unit 310 issues instructional information to RF section 335, to initiate communication, for example, transmit radio signals comprising voice communication data. RF section 335 comprises a receiver and a transmitter to receive and transmit radio signals. Antenna 340 facilitates the transmission and reception of radio signals. Upon receiving radio signals, RF module 335 may forward and convert the signals to baseband frequency for processing by processing unit 310.

The processed signals would be transformed into audible or readable information outputted via speaker 345, for example.

Processing unit 310 is adapted to perform various methods disclosed herein, among other operation. It will be apparent to one skilled in the art that mobile communication device 300 may be readily implemented using, for example, processing unit 310 or other data or digital processing device, either alone or in combination with external support logic. Although the present invention is described in the context of mobile communication, the present invention may also be used in any wireless communication systems using mobile devices, such as PDAs and laptop computers equipped with wireless communication capabilities. Moreover, the use of certain terms to describe the present invention should not limit the scope of the present invention to certain type of wireless communication system, such as UMB. The present invention is also applicable to other wireless communication systems using different air interfaces and/or physical layers, for example, UMTS, TDMA, CDMA, FDMA, WCDMA, and the like.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor.

The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The logic implementation shown in the figures described specific operations as occurring in a particular order. In alternative implementations, certain logic operations may be performed in a different order, modified or removed and still implement preferred embodiments of the present invention. Moreover, steps may be added to the above described logic and still conform to implementations of the invention.

Although the present invention may be implemented using the exemplary series of operations described herein, additional or fewer operations may be performed. Moreover, it is to be understood that the order of operations shown and described is merely exemplary and that no single order of operation is required.

The foregoing embodiments and advantages are merely exemplary and are not to be construed as limiting the present invention. The present teaching can be readily applied to other types of apparatuses and processes. The description of the present invention is intended to be illustrative, and not to limit the scope of the claims. Many alternatives, modifications, and variations will be apparent to those skilled in the art.

What is claimed is:

1. A method for providing an assignment acknowledgement, the method comprising:
   receiving a forward link overhead channel message at an access terminal (AT), the overhead channel message comprising a parameter used to indicate which shared control channel (SCCH) data blocks are to be acknowledged by the AT;
   receiving a forward link SCCH signal comprising SCCH data blocks;
   decoding the SCCH data blocks according to parameters provided by the overhead channel message;
   detecting a change in access terminal assignment for the AT based upon the SCCH signal;
   receiving forward link packet data at the AT via a data channel;
   identifying an offset which defines that a certain number of subpackets of the packet data have been transmitted before the assignment acknowledgement is to be transmitted according to parameters provided by the overhead channel message; and
   transmitting the assignment acknowledgement according to the offset to indicate successful decoding of one of the SCCH data blocks only if the packet data has not been acknowledged, and if the overhead channel message indicates that the block is to be acknowledged.

2. The method according to claim 1, wherein the access terminal assignment comprises encoding format data, modulation format data, resource allocation data, reverse link power adjustment data, persistent assignment indication, residue assignment indication, and supplemental assignment indication.

3. The method according to claim 1, wherein the overhead channel message further comprises identification of resources used to transmit the SCCH signal, encoding format data, modulation format data, number of SCCH and data blocks which are included in the SCCH signal.

4. The method according to claim 1, further comprising:
   utilizing a same resource but different signal waveform to transmit either an acknowledgement of successful decoding of the packet data or the assignment acknowledgement.

5. A method for providing an assignment acknowledgement, the method comprising:
   decoding forward link control channel data blocks according to parameters provided by an overhead channel message;
   receiving forward link packet data at an access terminal (AT) via a data channel;
   identifying an offset which defines that a certain number of subpackets of the packet data have been transmitted before the assignment acknowledgement is to be transmitted; and
   transmitting the assignment acknowledgement according to the offset to indicate successful decoding of one of the control channel data blocks only if the packet data has not been acknowledged.

6. A method for providing an assignment acknowledgement, the method comprising:
   receiving a forward link overhead channel message at an access terminal (AT), the overhead channel message comprising a parameter used to indicate which shared control channel (SCCH) data blocks are to be acknowledged by the AT;
   receiving a forward link SCCH signal comprising SCCH data blocks;

decoding the SCCH data blocks according to parameters provided by the overhead channel message;

detecting a change in access terminal assignment for the AT based upon the SCCH signal;

transmitting reverse link packet data from the AT via a data channel;

identifying an offset which defines that a certain number of subpackets of the packet data have been transmitted before the assignment acknowledgement is to be transmitted according to parameters provided by the overhead channel message; and transmitting the assignment acknowledgement according to the offset to indicate successful decoding of one of the SCCH data blocks only if the packet data has not been acknowledged and if the overhead channel message indicates that the block is to be acknowledged.

7. The method according to claim 6, wherein the access terminal assignment comprises encoding format data, modulation format data, resource allocation data, reverse link power adjustment data, persistent assignment indication, residue assignment indication, and supplemental assignment indication.

8. The method according to claim 6, wherein the overhead channel message further comprises identification of resources used to transmit the SCCH signal, encoding format data, modulation format data, number of SCCH and data blocks which are included in the SCCH signal.

9. A method for providing an assignment acknowledgement, the method comprising:

decoding shared control channel (SCCH) data blocks at an access terminal (AT) according to parameters provided by a overhead channel message;

transmitting reverse link packet data from the AT via a data channel;

identifying an offset which defines that a certain number of subpackets of the packet data have been transmitted before the assignment acknowledgement is to be transmitted; and transmitting the assignment acknowledgement according to the offset to indicate successful decoding of one of the SCCH data blocks only if the packet data has not been acknowledged.

\* \* \* \* \*